United States Patent

[11] 3,603,858

[72] Inventor Gilardelli Ugo
 Milano, Italy
[21] Appl. No. 832,215
[22] Filed June 11, 1969
[45] Patented Sept. 7, 1971
[73] Assignee Fabbrica Italiana Magneti Marelli S.p.A.
 Milano, Italy
[32] Priority June 11, 1968
[33] Italy
[31] 17571 A/68

[54] CONTROL MEANS FOR SELECTIVE CONTINUOUS AND INTERMITTENT OPERATION OF ELECTRIC WINDSHIELD WIPERS
 3 Claims, 6 Drawing Figs.
[52] U.S. Cl. ........................................... 318/443
[51] Int. Cl. ............................................ B60s 1/08
[50] Field of Search ................................. 318/443,
 444, 339, 472, 473, DIG. 2; 15/250.12, 250.17

[56] References Cited
UNITED STATES PATENTS

| | | | |
|---|---|---|---|
| 3,351,836 | 11/1967 | Kearns .......................... | 318/443 |
| 3,411,064 | 11/1968 | Mellor ........................... | 318/339 |

FOREIGN PATENTS

| | | | |
|---|---|---|---|
| 912,397 | 12/1962 | Great Britain ................ | 15/250.17 |
| 1,085,629 | 10/1967 | Great Britain ................ | 318/443 |
| 1,517,097 | 2/1968 | France ......................... | 15/250.12 |

Primary Examiner—Benjamin Dobeck
Assistant Examiner—Robert J. Hickey
Attorneys—Sidney G. Faber, Bernard Gerb, Marvin C. Soffen, Jerome M. Berliner, Samuel W. Weiner, Louis Weinstein and Marc S. Gross

ABSTRACT: Control apparatus for electric windshield wipers including a thermal switch having a heating winding for intermittent operation, and a resistor inserted in parallel with the heating winding in an electric braking circuit at the end of a wiping cycle.

PATENTED SEP 7 1971 3,603,858
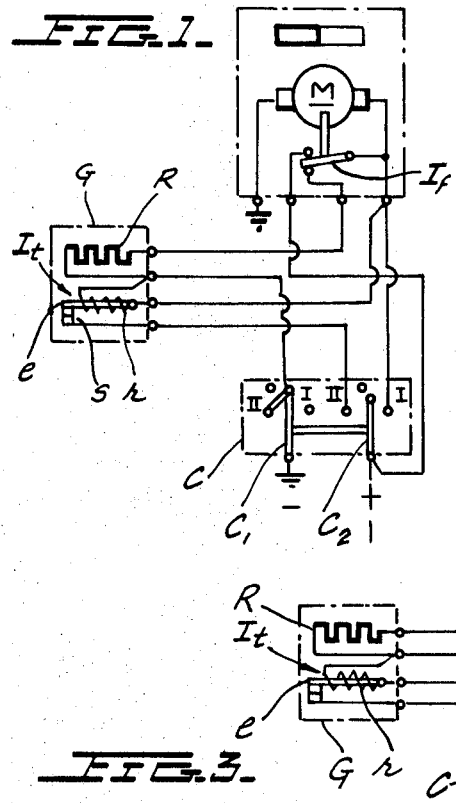
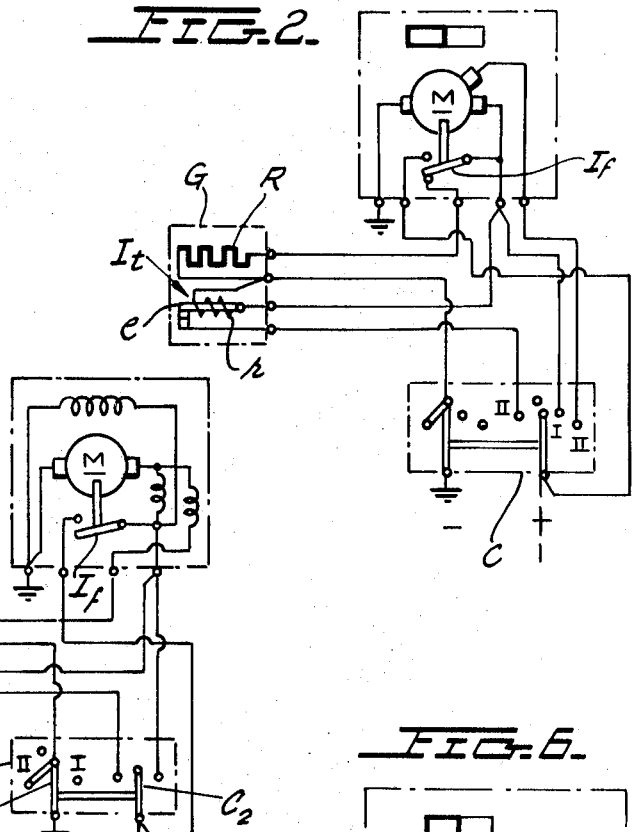
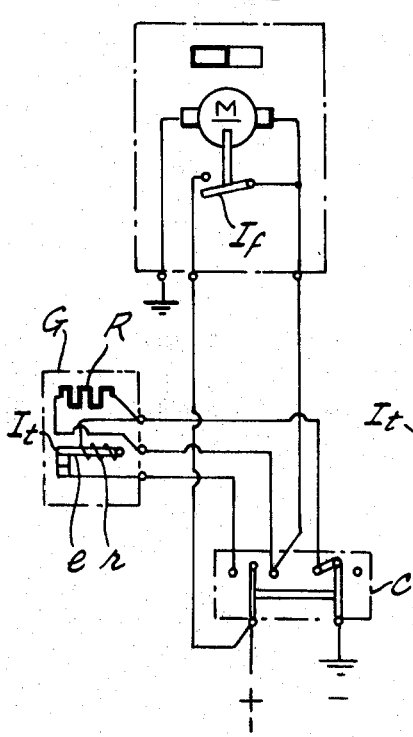
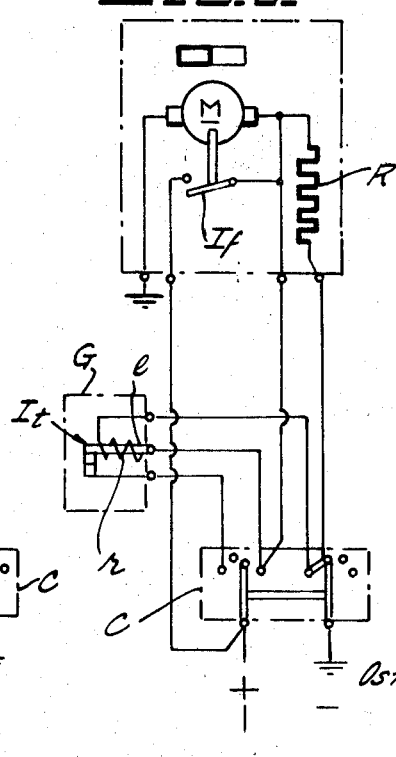
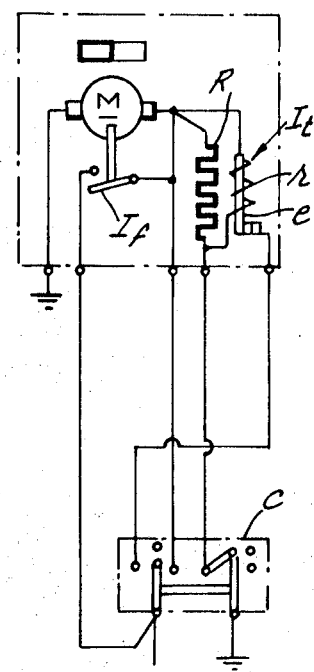
INVENTOR.
GILARDELLI UGO
BY
OSTROLENK, FABER, GERB & SOFFEN
ATTORNEYS

CONTROL MEANS FOR SELECTIVE CONTINUOUS AND INTERMITTENT OPERATION OF ELECTRIC WINDSHIELD WIPERS

The present invention refers to a driving device for continuously and intermittently working electric windshield wipers, in particular for permanent magnet-excited motors, wherein the intermittent working is obtained by means of a thermal cutout.

In the traditional systems of this type to guarantee the limit stop of the wiping blade, i.e. both at the end of the continuous or the intermittent working and between one wiping stroke cycle and the other during the intermittent working, the motor is electrically braked by short-circuiting the same.

In the case of systems using a permanent magnet-excited motor to perform the above-mentioned braking during the intermittent working, it is necessary to provide a special relay acting on the feeding circuit of the motor operated by the thermal cutout usually forming a single unit with said motor.

Obviously, the presence of the relay causes a considerable increase in cost of the system. Furthermore, the system results more complicated.

An object of the present invention is to realize a new permanent magnet-excited windshield wiper control circuit, which eliminates the above-mentioned relay thus realizing a system of low cost which is considerably simplified.

Another object of this invention is to realize a circuit which is suitable also for systems operated by excitation derived from wound motors.

Still another object is to provide systems allowing an easy substitution of the traditional ones.

The foregoing objects and other objects are achieved by inserting in the electric braking circuit of the motor, at the end of the continuous or intermittent working of the windshield wiper or at the end of each wiping stroke cycle during the intermittent working, a resistor having a suitable value.

According to a special circuit of the invention during intermittent working, which is being effected by means of a thermal cutout comprising a heating winding and a bimetallic blade, said resistor is excluded during the stroke of the windshield wiper blade and, when the limit stop switch is in its limit stop position and operated, the resistor is positioned parallel to the heating winding.

According to an embodiment of this invention, the electric braking circuit comprising said resistor is being realized through the limit stop switch in limit stop position.

The system will now be described and illustrated with reference to the attached drawing showing, as an example, the electric diagram of some embodiments according to the invention.

In the drawing:

FIG. 1 shows the electric diagram of a system with permanent magnet-excited motor;

FIG. 2 shows the diagram with two-speed motor;

FIG. 3 is the diagram of a wound excited motor;

FIG. 4, 5 and 6 show three variants of the diagram according to FIG. 1.

Referring to FIG. 1, M indicates a permanent magnet-excited motor, for example with ceramic magnets, C a two-way three-position changeover switch, $I_t$ a thermal switch realizing the intermittent working of the windshield wiper and $I_f$ the limit stop switch. The switch $I_t$ is of the known type and comprises a heating winding R and a bimetallic blade $e$. R indicates a resistor, which according to the invention is being inserted in the circuit of motor M both at the end of the operation (continuous or intermittent) of the windshield wiper and at the end of each wiping cycle, during the intermittent operation.

The value of resistor R is selected so as to be not so large as to cause braking action that is too fast, hence unsafe, and not so small as to cause excessive power drain which in the limiting case would short circuit the battery at the beginning of each complete stroke (to-and-fro motion) of the windshield wiper blade during intermittent working.

With reference to FIG. 1 the operation of the plant is as explained in the following:

When in rest condition, as shown in the drawing, the circuit of motor M, in which the resistor R is inserted, comprises: electrical ground, motor M, switch $I_f$ (which is in limit stop position), resistor R, contact $C_1$ of the changeover switch C (which is in 0 or rest position) and ground. When changeover switch C is turned to position I, the windshield wiper starts the continuous operation and the motor M is fed, in the well-known manner, either directly or through switch $I_f$. Obviously, in this working thermal cutout $I_t$ is excluded and the windshield wiper remains operative until changeover switch C is being brought in rest position (position 0).

When changeover switch C is turned back to 0 or rest position the above-mentioned circuit, i.e. the motor braking circuit, is being reestablished. Turning the change over switch C in II position the intermittent operation of the windshield wiper starts.

Motor M is fed through thermal cutout $I_t$ until the blade $e$ in expanding itself opens the pair of contacts S. At this point the windshield wiper blade terminates its cycle stopping in limit stop position, which corresponds to the cutout of the motor M feed. The correct stop is guaranteed since, in said position, the above-mentioned braking circuit comprising: electrical ground, motor M, switch $I_f$ in limit stop position, resistor R and changeover switch C in position II, is reestablished.

When the blade $l$ gets cool contact pair S close again and the motor is being fed again until a new cutout takes place followed by braking and so forth during intermittent operation.

In the special embodiment shown in FIG. 1, resistor R forms a single group or unit G with thermal cutout $I_t$. The diagram according to FIG. 2 differs from the preceding one only in that motor M is two-speed motor and, therefore, another position III of changeover switch C is provided to feed the third brush.

Also in this case, whichever the operating condition or speed may be, turning changeover switch in rest position the braking of the motor through the circuit comprising resistor R is obtained. Said braking takes place also at the end of each cycle during intermittent operation.

In the diagrams shown in FIGS. 1 and 2 the braking circuit is established by actuating switch $I_f$.

The diagram shown in FIG. 3 provides the use of a motor M' of the field-winding excited type. The unit G and changeover switch C remain the same and the connections are but slightly modified according to the different type of motor.

In any case the braking circuit comprises: electrical ground, the resistor R, the contact C in position o, and ground. From said diagram it is apparent that the invention may also be applied to motors with traditional circuits.

Furthermore, as it can be seen, passing from the magnet-excited to the wound-excited motor the cable connection is the same and, therefore, the circuits are interchangeable.

The diagram shown in FIG. 4 is still that of FIG. 1 except for a different circuit connection of motor M, unit G and of changeover switch C.

FIGS. 5 and 6 show the different positioning of resistor R and of the thermal cutout-resistor unit.

In the first diagram resistor R is incorporated in the motor; in the second the whole unit consisting of resistor R and switch $I_t$ is arranged in the motor.

The braking circuit according to the diagrams shown in FIGS. 4, 5 and 6 includes: electrical ground, the motor M, resistor R and ground.

In the diagrams according to FIGS. 3 to 6, said braking circuit does not include a limit stop switch $I_f$.

From the above it results that the various diagrams make no use of relays but of resistor R, which is a simpler and more economic component.

Furthermore said resistor when inserted in the braking circuit is parallel to the heating winding $r$. In particular in FIGS. 1 and 2 said resistor R is parallel to heating winding $r$ when switch $I_f$ is in limit stop position, whereas, in FIGS. 3 to 6 resistor R is constantly parallel to said winding. By insertion of resistor R in parallel with heating element r, when limit switch I$_f$ is in its stop, or open, position shown in the figures there is equal power absorption in winding r and figures, R to effect minimum drain from the power supply (not shown) associated with motor M the advantage is achieved that, at equal power absorption value of heating winding r, in respect to other possible insertions, a minor power supply from the battery is effected.

I claim

1. Control apparatus for electrical windshield wipers comprising:
   drive motor means coupled to said windshield wipers for establishing windshield wiping stroke action, said motor means including an electrical braking circuit;
   a resistor;
   switching circuit means for coupling said resistor into said electric braking circuit at prescribed intervals of windshield wiping cycles to terminate said wiping stroke action;
   selective means for operatively connecting said drive motor means to said wipers to selectively effect continuous or intermittent windshield wiping stroke action;
   said switching circuit means being coupled to insert said resistor into said electric braking circuit when both said continuous and intermittent wiping actions are to be terminated;
   said switching circuit means excluding said resistor from said electric braking circuit during a wiping stroke of said electric windshield wiper and inserting said resistor in said electric braking circuit at the end of each wiping stroke cycle;
   a thermal cutout switch having a heating winding and a single blade of bimetallic material cooperating with said drive motor means to establish said intermittent windshield wiping stroke action;
   said switching circuit means inserting said resistor in parallel with said heating winding at the end of each wiping stroke cycle.

2. Control apparatus as defined in claim 1, wherein there is also included a limit stop switch which in a closed position couples said resistor to said drive motor means to complete said electric braking circuit, 5 and when in said closed position, directly connects said resistor with the ends of said heating winding.

3. Control apparatus as defined in claim 1, wherein said braking resistor is directly connected in parallel with said heating winding.